Figure 1:
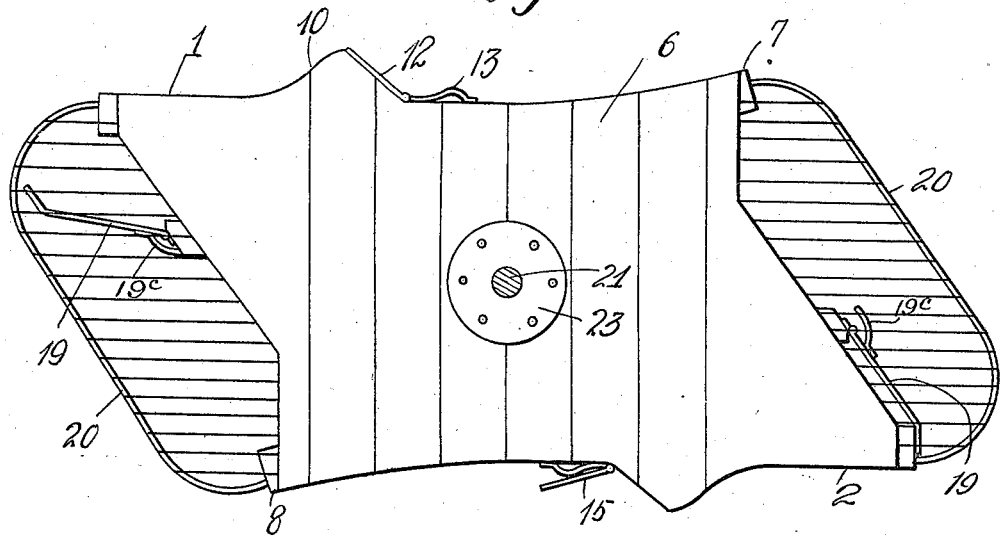

C. M. RHODES.
POWER MOTOR.
APPLICATION FILED DEC. 27, 1909.

984,025.

Patented Feb. 14, 1911.

2 SHEETS—SHEET 1.

Witnesses:—
Samuel Payne
Karl H. Butler

Inventor
C. M. Rhodes.
by H. C. Everts
Attorneys.

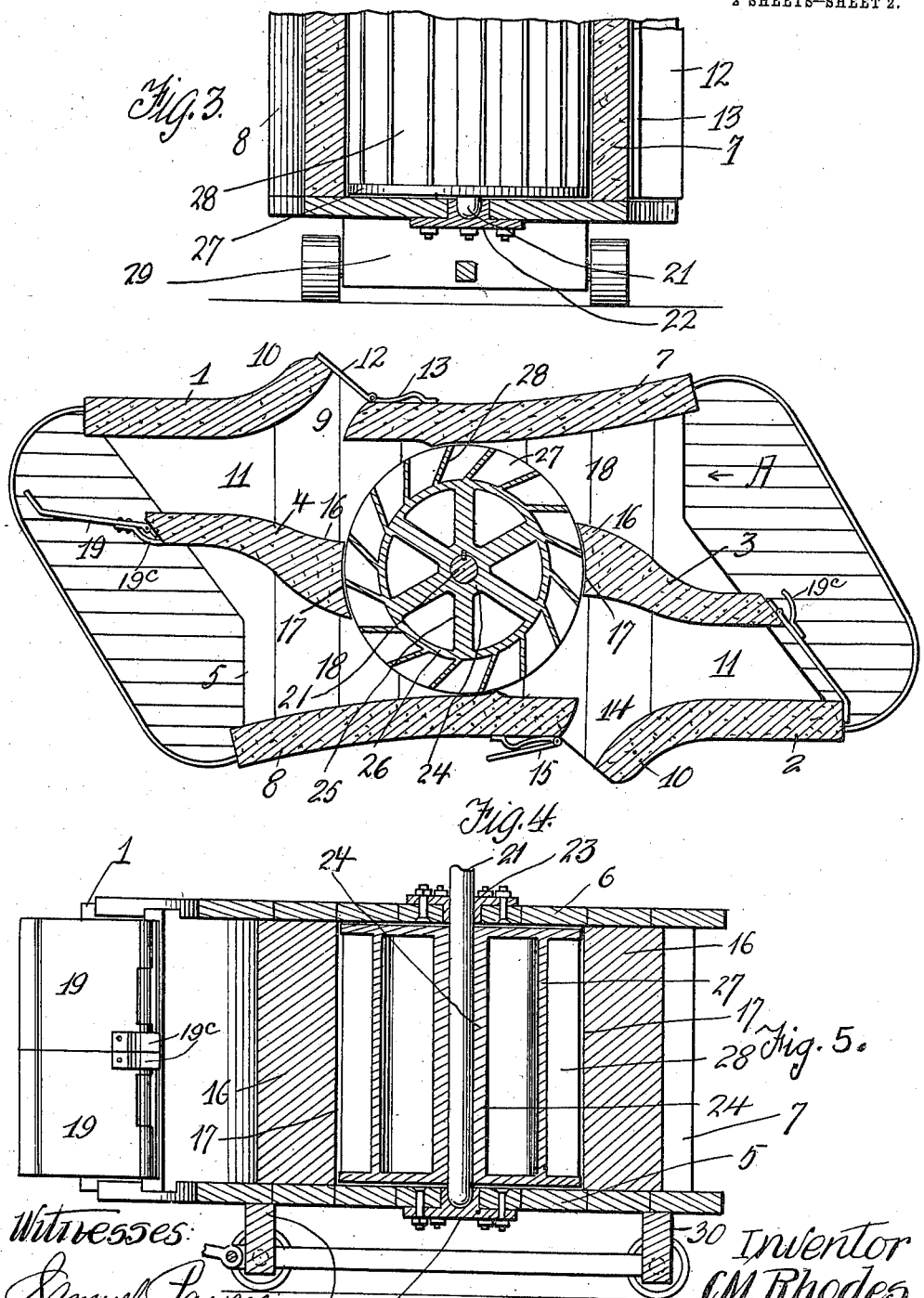

UNITED STATES PATENT OFFICE.

CHARLES M. RHODES, OF STEUBENVILLE, OHIO.

POWER-MOTOR.

984,025.

Specification of Letters Patent.  Patented Feb. 14, 1911.

Application filed December 27, 1909. Serial No. 535,197.

*To all whom it may concern:*

Be it known that I, CHARLES M. RHODES, a citizen of the United States of America, residing at Steubenville, in the county of Jefferson and State of Ohio, have invented certain new and useful Improvements in Power-Motors, of which the following is a specification, reference being had therein to the accompanying drawing.

This invention relates to power motors and more particularly to that type commonly known as wave motors adapted to be located in the surf of the ocean and actuated by the undulatory and forcible movement of water.

The objects of my invention are to provide in a manner as hereinafter set forth a power motor of the class referred to whereby water which has entered at the inlet side of a motor to operate it can exhaust or leave the motor without retarding the operation thereof, and to provide a wave motor of novel construction whereby a maximum degree of power can be obtained from a wave, irrespective of the depth of the same.

Other objects of the invention are to furnish a motor of the above type with novel means for deflecting water to the motor and to construct the said means whereby sea-weed shells and wreckage will be prevented from entering the motor and injuring the motor or retarding the operation thereof.

Further objects of the invention are to provide a motor that will be actuated by currents flowing in opposite directions, for instance as incoming waves and the undertow thereof, and to provide a portable motor that can be removed from the water for repairs or when not in use.

The above objects are attained by a motor that can be operated by any regular or irregular currents of motive fluid, such as water or air, but in the accompanying illustration a motor is shown as designed for strong currents of water, such as may be found in the ocean, lakes, rivers, or any other bodies of water.

Briefly described, the motor in accordance with this invention embodies a series of circumferentially arranged and tangentially disposed power blades, these blades being held stationary by a rotatable power transmitting wheel, which is housed within a structure having side walls adapted to deflect water toward the wheel. The structure is mounted upon suitable trucks and can be correctly positioned relatively to a current, while the flow of a current to and from the motor can be controlled by trap gates carried by the motor structure.

The invention will be hereinafter considered in detail and then specifically claimed, and reference will now be had to the accompanying drawings, wherein is shown the preferred embodiment of the invention, but it is to be understood that changes, variations and modifications can be resorted to which come within the scope of the claims hereunto appended.

Figure 2:
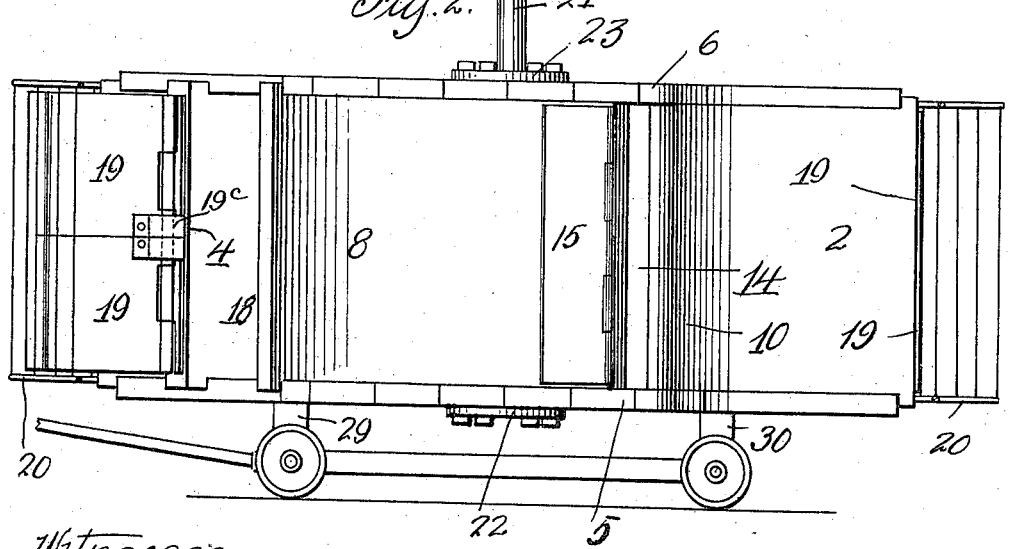

In the drawings:—Figure 1 is a plan of the motor. Fig. 2 is a side elevation of the same. Fig. 3 is a vertical cross sectional view of a portion of the motor. Fig. 4 is a horizontal sectional view of the same, and Fig. 5 is a longitudinal sectional view.

My power motor comprises outer walls 1 and 2, inner or intermediate walls 3 and 4, a bottom 5 and a top 6, the bottom 5 and the top 6 being constructed of planks while the walls 1 to 4 inclusive are preferably made of concrete and project at their ends beyond the end of the bottom 5 and top 6. The wall 1 at one end of the motor is flared outwardly, as at 7, and the wall 2 at the opposite end of the motor is similarly flared, as at 8. The wall 1 adjacent to the end opposite flared end is provided with a vertical slot or opening 9, and the wall of said opening nearest the end of the wall 1 is flared outwardly, as at 10, whereby the opening 9 will be at an angle relatively to the channel 11 between the wall 1 and the wall 4. The outer end of the opening 9 is adapted to be closed by a gate 12, either spring-pressed or prevented from engaging the wall by a member 13, whereby water can pass behind the gate to swing the same to a closed position. The wall 2 adjacent to the end thereof opposite the flared portion 8 of said wall is provided with a similar opening 14 adapted to be closed by a gate 15. The planks forming the bottom 5 and the top 6 are made of a sufficient length to extend from the outer edges of the wall 1 to the outer edges of the wall 2 and from the openings 14 and 9 to the flared portions of said walls. The walls 3 and 4 are of a less length than the walls 1 and 2 and said walls have the inner ends thereof enlarged, as at 16, and curved, as at 17, the enlargements of said walls widening the channel 11 adjacent to the openings 9 and 14 and reducing the width of the channels 18 between the walls 1 and 2, and 3 and 4.

The outer end of the intermediate wall 3 as well as the outer end of the intermediate wall 4 has attached thereto a pair of hinged gates, the gates of each pair being arranged one over the other. The gates of each pair may be spring-controlled. A stop member 19ᶜ for each gate is employed for limiting the opening movement of the gates. Each stop member 19ᶜ is carried by its respective gate and is clearly shown in Figs. 4 and 5. The gates are normally in a closed position but it will be stated that when the gates 19 carried by the wall 3 are in closed position, they extend over and engage the wall 2 and that when the gates carried by the wall 4 are in closed position, they extend over and engage the wall 1. The pairs of gates are provided to take care of any undertow, for example, if the motor is located near the shore when there is a strong undertow, the undertow will keep the lower gate of the pair closed and pass around the motor while the inflowing current will continue to pass through the motor over the gate that is closed to the undertow. The free ends of the gates are angularly-disposed so that they will abut against the ends of the walls 1, 2, and the gates are adapted to close the channels 11, but when the motor is in use, only one pair of gates will be in closed position, for the reason that the current of water passing through one of the channels 11 will force the other pair of gates open. It will be assumed that the current is passing in the direction as indicated by the arrow, Fig. 4, and under such conditions, the gates attached to the outer end of the wall 4 will be opened while the gates which are attached to the outer end of the wall 3 will be closed.

Each end of the motor is provided with a screen frame 20, each frame extending from the top 6 to the bottom 5 of the motor as clearly shown in Figs. 1 and 4. The screens prevent sea-weed and wreckage from entering the channels 11 so as not to interfere with the operation of the power wheel as well as the gates of the motor.

The power wheel comprises a vertical shaft 21 having the lower end thereof revolubly mounted in a bearing 22 carried by the bottom 5, while the upper end extends through a bearing 23 carried by the top 6. Suitably mounted upon the shaft 21 between the bottom and top 5 and 6 is a hub 24 having spokes 25 supporting a vertical cylindrical shell 26 provided with heads 27 of a greater diameter than the shell 26, and between said heads is arranged a series of circumferentially and tangentially disposed power blades 28. The upper end of the shaft 21 is adapted to be connected to a suitable power transmission, whereby mechanism located ashore or upon the top 6 of the motor structure can be driven.

The motor structure is supported by trucks 29 and 30, whereby the structure can be moved into the surf or a river and withdrawn when it is desired to make repairs or place the power motor out of commission.

In order that the operation of the power motor can be fully understood, it will be assumed that a current flows into the structure in the direction of the arrow A. The current entering the channel 18 engages the blades 28 and causes the power wheel to revolve, the current continuing into the channel 11 and holding the gate 19 open as long as the current flows in the direction of the arrow A. With the current entering the channel 18 in the direction of the arrow A the gate 19 carried by the wall 3 will be held against the wall 2, and such water that enters the channel 11 between the projecting ends of the walls 2 and 3 will be discharged through the opening 14. As the walls 2 and 3 project from the top and bottom of the motor, it is evident that an open space is provided inwardly of the gate 19 carried by the wall 3 so that water can enter the channel 11, but such water as before stated will be discharged through the opening 14.

If the power motor is used in the surf of the ocean where there would be an undertow, this under current could enter the channel 18 between the walls 4 and 2 and assist in operating the power wheel and since a portion of the gate carried by the wall 3 is retained in a closed position by the inflowing current, the undertow after engaging the blades 28 of the power wheel can leave the motor through the opening 14 or that portion of the end gate opened by the undertow.

From the foregoing it will be observed that either end of the motor structure can be presented to a current and as long as water continues to flow the wheel will be driven.

With the walls made of reinforced concrete, the top and bottom of heavy planks and the power wheel of metal, the power motor will stand a rough usage to which it is subjected and develop power in the strongest of currents.

Having now described my invention what I claim as new is:—

1. A power motor comprising a body portion including side walls, intermediate walls, a top and a bottom, said intermediate walls constituting deflectors for the water, a power wheel arranged within said body portion and interposed between the inner ends of the intermediate walls, and gates carried by the outer ends of the intermediate walls and capable of engaging one end of each of the side walls.

2. A power motor comprising a body portion including side walls, intermediate walls, a top and a bottom, said intermediate walls constituting deflectors for the water, a power wheel arranged within said body portion and interposed between the inner ends of the intermediate walls, and gates carried by the outer ends of the intermediate walls and capable of engaging one end of each of the side walls, said side walls of greater length than said top and bottom and said intermediate walls projecting from the outer edges of the top and bottom.

3. A power motor comprising a body portion including side walls, intermediate walls, a top and a bottom, said intermediate walls constituting deflectors for the water, a power wheel arranged within said body portion and interposed between the inner ends of the intermediate walls, and gates carried by the outer ends of the intermediate walls and capable of engaging one end of each of the side walls, and each of said side walls provided with an outlet, and a gate exteriorly of each of the side walls for closing said outlet.

4. A power motor comprising a body portion including side walls, intermediate walls, a top and a bottom, said intermediate walls constituting deflectors for the water, a power wheel arranged within said body portion and interposed between the inner ends of the intermediate walls, and gates carried by the outer ends of the intermediate walls and capable of engaging one end of each of the side walls, said side walls of greater length than said top and bottom and said intermediate walls projecting from the outer edges of the top and bottom, and each of said side walls provided with an outlet, and a gate exteriorly of each of the side walls for closing said outlet.

5. A power motor comprising a body portion including a pair of side walls, a pair of intermediate walls, providing in connection with the side walls inlet and outlet passages, said intermediate walls further constituting deflectors for the water, said body portion furthermore comprising a top and a bottom secured to said walls, a power wheel interposed between the inner ends of said intermediate walls, means connected to one of the intermediate walls and adapted to engage one of the side walls for closing one of the outlet passages, means connected to the outer end of the other intermediate wall and adapted to engage the other side walls for closing the outer end of the other outlet passage.

6. A power motor comprising a body portion including a pair of side walls, a pair of intermediate walls, providing in connection with the side walls inlet and outlet passages, said intermediate walls further constituting deflectors for the water, said body portion furthermore comprising a top and a bottom secured to said walls, a power wheel interposed between the inner ends of said intermediate walls, means connected to one of the intermediate walls and adapted to engage one of the side walls for closing one of the outlet passages, means connected to the outer end of the other intermediate wall and adapted to engage the other side walls for closing the outer end of the other outlet passage each of said walls provided with a discharge opening communicating with an outlet passage, and means carried by each of the side walls for closing the discharge opening formed therein.

In testimony whereof I affix my signature in the presence of two witnesses.

CHARLES M. RHODES.

Witnesses:
KARL H. BUTLER,
A. H. RABSÁG.